US010083106B2

(12) United States Patent
Moran et al.

(10) Patent No.: US 10,083,106 B2
(45) Date of Patent: Sep. 25, 2018

(54) COMPUTER AIDED BUG REPORTING SYSTEM FOR GUI APPLICATIONS

(71) Applicant: College of William and Mary, Williamsburg, VA (US)

(72) Inventors: Kevin P. Moran, Williamsburg, VA (US); Mario Linares Vasquez, Williamsburg, VA (US); Carlos E. Bernal-Cardenas, Williamsburg, VA (US); Denys Poshyvanyk, Williamsburg, VA (US)

(73) Assignee: College of William & Mary, Williamsburg, VA (US)

( * ) Notice: Subject to any disclaimer, the term of this patent is extended or adjusted under 35 U.S.C. 154(b) by 138 days.

(21) Appl. No.: 15/149,586

(22) Filed: May 9, 2016

(65) Prior Publication Data
US 2017/0322866 A1 Nov. 9, 2017

(51) Int. Cl.
*G06F 9/44* (2018.01)
*G06F 11/36* (2006.01)

(52) U.S. Cl.
CPC .................. *G06F 11/362* (2013.01)

(58) Field of Classification Search
CPC ........................................ G06F 11/36–11/3668
USPC .................................................. 717/124–135
See application file for complete search history.

(56) References Cited

U.S. PATENT DOCUMENTS

| 2004/0255270 A1* | 12/2004 | McGlinchey | G06F 9/4446 717/109 |
| 2010/0229112 A1* | 9/2010 | Ergan | G06F 3/04895 715/764 |
| 2013/0268810 A1* | 10/2013 | Prasad | G06F 11/0751 714/48 |
| 2014/0237304 A1* | 8/2014 | Lai | G06F 11/0742 714/57 |
| 2015/0193329 A1* | 7/2015 | Strode | G06F 11/0709 717/125 |
| 2016/0162475 A1* | 6/2016 | Bondarenko | G06F 11/3636 704/9 |
| 2016/0371169 A1* | 12/2016 | Guo | G06F 11/3612 |
| 2017/0277625 A1* | 9/2017 | Shtuchkin | G06F 11/3688 |

* cited by examiner

*Primary Examiner* — Jue Louie
(74) *Attorney, Agent, or Firm* — Jason P. McDevitt

(57) ABSTRACT

A computer aided bug reporting system for GUI-based apps extracts and stores static and dynamic data from an app's source code. Using the extracted/stored data, a sequence of prompts is generated on a bug reporter's display device. The prompts are ordered in accordance with one of the app's execution paths associated with an encountered bug wherein each of the prompts is associated with one of the path's execution steps. Each prompt presents the GUI components and attributes of the GUI components associated with the one of the execution steps wherein selected ones of the GUI components and selected ones of the attributes of the GUI components are defined. The selected ones of the GUI components and the selected ones of the attributes of the GUI components for the execution steps associated with the one of the execution paths are presented for review by a software developer.

3 Claims, 5 Drawing Sheets

COMPUTER AIDED BUG REPORTING SYSTEM FOR GUI APPLICATIONS

STATEMENT REGARDING FEDERALLY SPONSORED RESEARCH AND DEVELOPMENT

This invention was made with government support under Grant Numbers CCF-1218129 and CCF-1253837 awarded by the National Science Foundation. The government has certain rights in the invention.

FIELD OF INVENTION

The field of the invention relates generally to computer aided systems and methods, and more particularly to a computer aided bug reporting system and method for GUI-based applications.

BACKGROUND OF THE INVENTION

Smartphones and mobile computing have skyrocketed in popularity in recent years, and adoption has reached near-ubiquitous levels. An increased demand for high-quality and robust mobile applications is being driven by a growing user base that performs an increasing number of computing tasks on "smart" devices. Due to this demand, the complexity of mobile applications has been increasing, making development and maintenance challenging. The intense competition present in mobile application (or "app" as it is also known) marketplaces means that if an app is not performing as expected due to bugs or lack of desired features, users are less likely to use the app again and will abandon it for another one with similar functionality.

Software maintenance activities are known to be generally expensive and challenging. One of the most important maintenance tasks is bug report resolution. However, current bug tracking systems rely mostly on unstructured natural language bug descriptions. These descriptions can be augmented with files uploaded by the reporters (e.g., screen shots). As an important component of bug reports, reproduction steps are expected to be reported in a structured and descriptive way, but the quality of this description mostly depends on the reporter's experience and attitude towards providing enough information. Therefore, the reporting process can be cumbersome, and the additional effort to create detailed reports means that many users are unlikely to enhance their reports with extra information.

Consequently, bug reports created with traditional issue tracking systems are currently unstructured and widely vary depending on the reporter's capability and attention to detail, and many software developers believe that bug reports are lacking in information. Further, the information most useful to developers is often the most difficult for reporters to provide and the lack of this information is a major reason behind non-reproducible bug reports. Difficulty providing such information, especially reproduction steps, is compounded in the context of mobile applications due to their complex event-driven and "graphical user interface" (or GUI as used hereinafter) based nature. Furthermore, many bug reports are created from textual descriptions of problems in user reviews. As would be expected, only a reduced set of user reviews can be considered useful and/or informative since reviews do not generally refer to details of the app implementation.

The above issues point to a prominent problem for bug tracking systems in general. That is, there is a lexical gap that exists between bug reporters (e.g., testers, beta users) and developers. Reporters typically only have functional knowledge of an app even if they have development experience themselves, whereas the developers working on an app tend to have intimate code level knowledge. In fact, there is a difference between the way experts and non-experts write bug reports as measured by textual similarity metrics. When a developer reads and attempts to comprehend (or reproduce) a bug report, the developer has to bridge this gap by reasoning about the code level problems from the high-level functional description in the bug report. If the lexical gap is too wide, the developer may not be able to reproduce and/or subsequently resolve the bug report.

BRIEF SUMMARY OF THE INVENTION

Accordingly, it is an object of the present invention to provide a method and system that improves the reporting of bugs in GUI-based software applications.

In accordance with the present invention, a computer aided bug reporting system for GUI-based applications includes a processor configured to extract first data indicative of GUI components and attributes of the GUI components from source code for a GUI-based application having execution paths that generate a plurality of screen displays according to user interactions during run-time execution of the source code. Each screen display uses the GUI components defined by the source code. The first data is stored in a database. The source code is executed in a run-time environment through its execution paths according to automatically-generated user inputs. Each execution path is defined by execution steps wherein each execution step generates a run-time screen display using at least one of the GUI components. Second data indicative of each run-time screen display is also stored in the database. Using the first data and second data, a sequence of prompts is generated on a bug reporter's display device. The prompts are ordered in accordance with one of the execution paths associated with an encountered bug wherein each of the prompts is associated with one of the execution steps. Each prompt presents the GUI components and attributes of the GUI components associated with the one of the execution steps wherein selected ones of the GUI components and selected ones of the attributes of the GUI components are defined. The selected ones of the GUI components and the selected ones of the attributes of the GUI components for the execution steps associated with the one of the execution paths are displayed on an electronic image for review by a software developer.

BRIEF DESCRIPTION OF THE DRAWINGS

The summary above, and the following detailed description, will be better understood in view of the drawings that depict details of preferred embodiments.

DETAILED DESCRIPTION OF THE INVENTION

The present invention addresses the problem of making bug reports more useful for developers. In general, the present invention is a computer aided paradigm that provides a user/reporter with a standardized bug reporting tool and provides a developer with a logical and structured report of the user/reporter's execution steps taken to cause the occurrence of a bug. Given the enormity of GUI-based software or "apps" being developed, the present invention will be described for its use with GUI-based apps. Further and by way of an illustrative example, the present invention will be described for apps developed for the Android platform. However, it is to be understood that the present invention could also be adapted for use with other software platforms without departing from the scope of the present invention.

The computer aided bug reporting method and system uses a novel analyze and report generation paradigm to enable a user/reporter to provide a developer with actionable information about a software bug. In general, the method and system are configured to provide bug reporting functionality for one version of a software code base. That is, the analyze portion of the paradigm must be performed for each new version of the software code prior to the operation of the report generation portion of the paradigm. Accordingly, the present invention is a particularly useful tool for testers and beta users of a software version that test an app prior to its release to the general public. However, the present invention can be used by any user at any time during the life of an app.

The analyze and report generation paradigm is defined by two workflow phases, i.e., the analysis phase and the report generation phase. In the analysis phase, the present invention collects data related to the GUI components (or simply "components" as also referred to herein) and event flow of an app through a combination of static analysis and dynamic analysis of the app. Then, in the report generation phase, the collected data is used to first walk a user/reporter (who encountered the bug) through the steps that the app executed on the way to the production of the bug. The user/reporter's executed steps, to include GUI component selections/definitions up to the point the bug was encountered, are then assembled into a stepwise report for review by the app's developer(s). At each execution step of the report, the reporter's executed steps and GUI component selections can be used to complete a natural language template in order to provide the developer(s) with a natural language description of each execution step and the GUI component information associated therewith.

Figure 1:
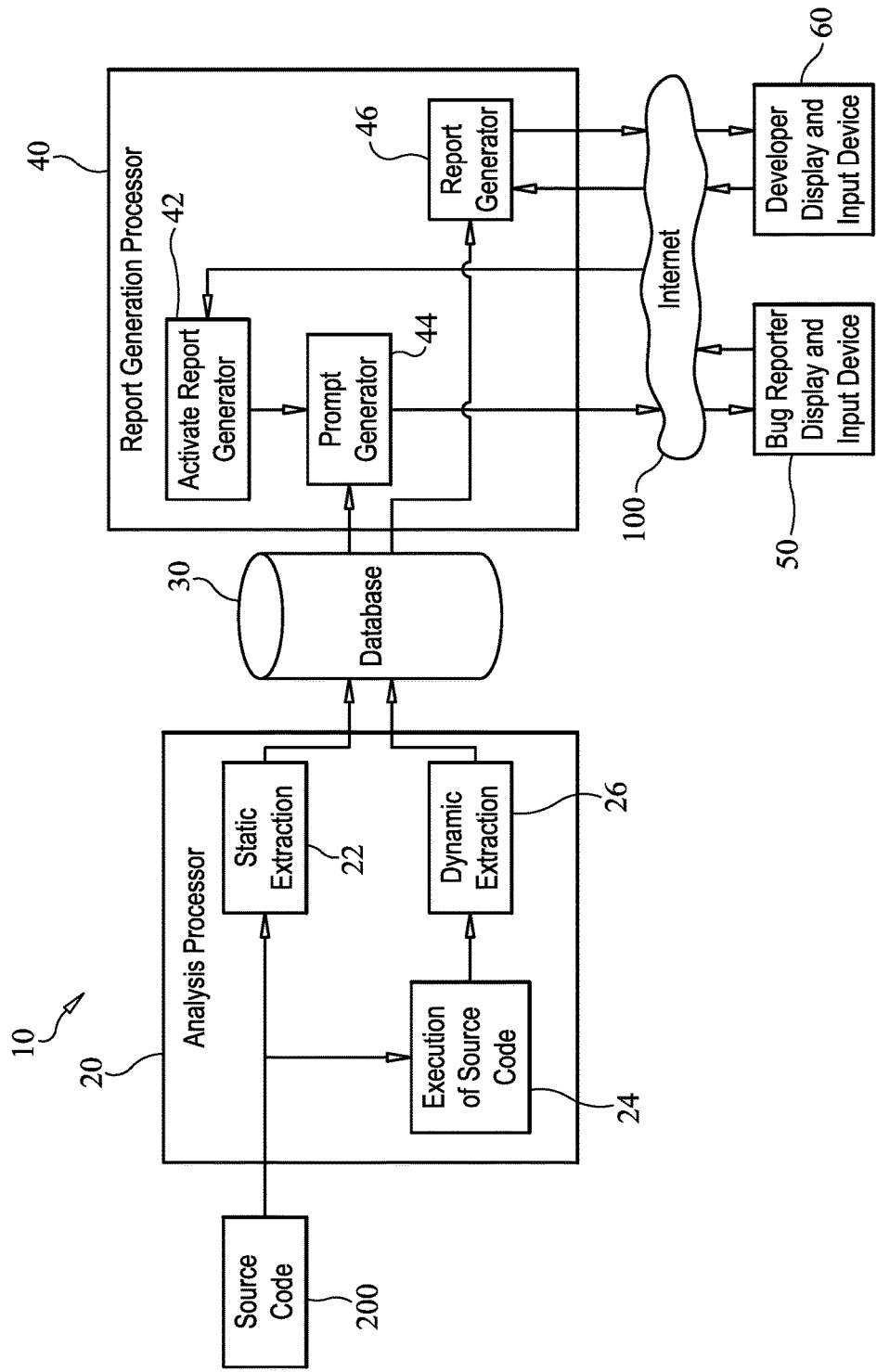
FIG. 1 is a schematic view of a computer aided bug reporting system for GUI-based applications in accordance with an embodiment of the present invention.

Referring now to the drawings and more particularly to FIG. 1, a computer aided bug reporting system for GUI-based applications in accordance with an embodiment of the present invention is shown and is referenced generally by numeral 10. In the illustrated embodiment, system 10 includes an analysis processor 20, a database 30, and a report generation processor 40. It is to be understood that processors 20 and 40 could be realized by a single processor or by more than two processors without departing from the scope of the present invention. Similarly, it is to be understood that database 30 can be realized by a single database or multiple databases without departing from the scope of the present invention. As will be explained later herein, report generation processor 40 interfaces with, for example, a bug reporter display and input device 50 (e.g., a desktop system, a laptop computer, a mobile computing device, etc.) and a developer display and input device 60. Device 50 is typically accessible to a tester or beta user who will be making a bug report, and device 60 is typically accessible to the app's developer(s). Interfacing between system 10 and devices 50/60 can occur over a wired network or over a wireless transmission medium that includes internet 100. That is, system 10 could be accessed online by remotely-located users/subscribers thereof, e.g., device 50 and device 60 are different devices located at different locations.

Analysis processor 20 is used to collect all of the data that is required for use by report generation processor 40. The collected data is stored in and accessed from database 30. Analysis processor 20 is supplied with an app's source code 200 to perform both static extraction of data and dynamic extraction of data. In general, a static extraction 22 acts on source code 200 to extract all of the GUI components and associated attributes defined in source code 200. More specifically, for each GUI component in source code 200, static extraction 22 extracts the following:

possible actions on the GUI component;
    the type of GUI component (e.g., button, spinner, etc.);
    activities the GUI component is contained within; and
    class files where the GUI component is instantiated.

As a result, static extraction 22 defines the universe of possible GUI components within the domain of an app, and establishes traceability links connecting the GUI components that users/testers operate upon to specify information such as the class or activity the components are located within.

Static extraction 22 can include several processing steps to extract the above-identified information. Such processing steps can include the following using commercially-available or open-source tools:

decompilation using, for example, "dex2jar"available online at code.google.com and "jd-cmd"available online at github.com;
    source file-to-XML-based representation using, for example, "sr-cML"available online at srcml.org;
    extraction of resource files from the app's APK using, for example, "apk tool"available online at code.google.com;
    extraction of IDs and types of GUI components from the xml files located in the app's resource folders (i.e., /res/layout and /res/menu of the decompiled app or src); and
    parsing and linking the GUI component information to extracted app source code files using the srcML representation of the source code.

Data indicative of the statically-extracted information is stored in database 30.

Dynamic extraction of data requires an execution 24 of source code 200 through the code's tree of execution paths, each of which is defined by a series of execution steps. Execution 24 can occur on any run-time environment to include a hardware device, an emulator, etc., the choice of which is not a limitation of the present invention. As is the case with any GUI-based app, execution of the app's source code along its execution paths generates run-time screen display data at each execution step of an execution path. That is, execution 24 automatically generates user interactions at each execution step of an execution path. Each run-time screen that would be generated during such interactions includes the use of GUI components. A dynamic extraction 26 extracts dynamic contextual information such as the location of the GUI component on the screen display to enhance the data stored in database 30 with both run-time GUI and application event-flow information. The goal of dynamic extraction 26 is to explore an app in a systematic manner. Extracted run-time information related to the GUI components during execution can include the following:

- the text associated with different GUI components (e.g., the "Send" text on a button to send an email message);
- whether the GUI component triggers a transition to a different activity;
- the action performed on the GUI component during systematic execution;
- full screen-shots before and after each action is performed;
- the location of the GUI component object on the test device's screen;
- the current activity and window of each step;
- screen shots of the specific GUI component; and
- the object index of the GUI component (to allow for differentiation between different instantiations of the same GUI component on one screen).

For apps designed to run on an Android platform, dynamic extraction 26 can use the "UIAutomator" app framework included in the Android SDK available online at developer.android.com. The UIAutomator framework provides for the capture of pop-up menus that exist within menus, internal windows, and onscreen keyboards. Extraction 26 can also include a systematic depth-first search (DFS) algorithm for application traversal that performs click events on all the clickable components in the GUI hierarchy reachable using the DFS heuristic.

Before each execution step, dynamic extraction 26 calls UIAutomator subroutines to extract the contextual information outlined above regarding each currently displayed GUI component. The action associated with each GUI component is then executed in a depth-first manner on the current screen. In the DFS algorithm, if a link is clicked that would normally transition to a screen in an external activity (e.g., clicking a web link that would launch a web browser app), a "Back" command is executed in order to stay within the current app. If the DFS exploration exits the app to the home screen of the device/emulator for any reason, the app is re-launched and continues the GUI traversal. During the DFS exploration, extraction 26 captures every activity transition that occurs after each action is performed (e.g., whether or not a new activity is started/resumed after an action to launch a menu). This provides for the building of a model of the app execution that can be used later to help track a reporter's relative position in the app when they are using the system to record the steps to reproduce a bug.

When an app's user/tester encounters a software bug, they generally have traversed a number of execution steps along an execution path of the app. An accurate recording of the execution steps is critical to a developer's ability to reproduce and ultimately fix the app's source code. Towards this end, report generation processor 40 provides the bug reporter with a natural language input that is used to define a high-level overview of the bug, and provides the reporter with a sequence of prompts that guide the reporter through the execution steps leading to the bug.

During the report generation phase, system 10 aids the bug reporter in constructing the steps needed to recreate a bug by making suggestions based on the potential GUI state reached by the declared execution steps. That is, for each execution step, the present invention verifies that the suggestion made to the bug reporter is correct by presenting the bug reporter with contextually relevant screen shots corresponding to the current action the reporter wants to describe.

The bug reporter initiates the bug report generation process by sending a request to activate report generation 42. For example, in the illustrated embodiment, such a request is made at device 50 and transmitted to processor 40 via internet 100. Request to activate report generation 42 can serve as a point of initial interaction with the bug reporter to collect some identifying information (e.g., name of bug reporter, device used to run the app, etc.) and a brief textual description of the bug in question. Next, a prompt generator 44 generates a sequence of prompts for display on device 50. The sequence of prompts traverses an order in accordance with the execution path that led to the occurrence of the bug. More specifically, the prompts are a sequence of drop down menus and/or fill-in boxes that identify the GUI components and action options for the bug reporter in a stepwise manner so that the reporter can define the execution steps along the execution path leading to the occurrence of the bug. Prompt generator 44 generates the prompts using the statically and dynamically extracted data stored in database 30. Prompt generator 44 typically begins from a "cold start" of the app (i.e., the first window and screen that appear after the app is launched). However, the present invention could also be started from any point along any execution path without departing from the scope of the present invention.

Figures 2, 3, 4:
FIG. 2 is a screen shot of a bug reporter's display showing initial prompts at the start of a bug reporting process in accordance with an embodiment of the present invention.
FIG. 3 is a screen shot of a bug reporter's display showing a drop down list of possible GUI component actions that a user can perform at a particular execution step in an app's execution.
FIG. 4 is a screen shot of a bug reporter's display showing a drop down list corresponding to the GUI component associated with the possible action at the execution step.

A series of exemplary processes implements by prompt generator 44 will now be described. However, it is to be understood that the prompts generated by prompt generator 44 will be different for every app and are dependent upon the execution path leading to the bug. By way of an illustrative example, prompt generator 44 will be explained for a simple example. Referring now to FIG. 2, a screen shot 52 at device 50 is shown for a Document Viewer bug. According to the various fields in FIG. 2, the reporter would fill in the appropriate information in the "Reported by", "Device", screen "Orientation", "Title for the bug report", and "Brief description of the bug you encountered" fields. Non-limiting examples of information are shown in FIG. 2

To help the bug reporter in entering reproduction steps, each execution step in the reproduction process is modeled as an {action, component} tuple corresponding to the action the reporter wants to describe at each step (e.g., tap, long-tap, swipe, etc.) and the GUI component in the app with which they interacted (e.g., "Name" text view, "OK" button, "Days" spinner). Since reporters are generally aware of the actions and GUI components with which they interact, the present invention provides an intuitive manner for them to construct reproduction steps. Prompt generator 44 allocates suggestions to drop down lists based on a decision tree taking into account a reporter's position in the app's execution path beginning from a cold start of the app.

FIG. 3 illustrates a drop down list that would appear on device 50 and that corresponds to the possible actions a user can perform at a given point in an execution step. In the example with the Document Viewer bug, assume the reporter selects "click" as the first action in the set of possible actions shown in FIG. 3. Note that the "type" action corresponds to the user entering information from the device keyboard. When the reporter selects the "type" action, a text box would be presented in the prompt on device 50 to collect the information the reporter typed in the box during execution of the app that caused the bug.

FIG. 4 illustrates another drop down list (appearing on device 50) of attributes corresponding to the component associated with the action in the execution step. In the illustrated example, the bug reporter can define, for example, the following:

"Component Type": this is the type of component that is being operated upon, e.g., "Button" in the example illustrated in FIG. 4;

"Component Text": the text associated with or located on the component, e.g., "OK", "Restore", "Search" in the example illustrated in FIG. 4;

"Relative Location": the relative location of the component on the screen, e.g., "Center", "Top Right" in the example illustrated in FIG. 4; and "Component Image": an in-situ (e.g., embedded in the drop down list) image of the instance of the component, e.g., the images of the "OK", "Restore" and "Search" buttons in the example illustrated in FIG. 4.

As will be explained later herein, relative location is displayed to make it easier for reporters to reason about the on-screen location, rather than reasoning about pixel values. For the illustrated example, the component drop down list is populated with all of the clickable components in the Main Activity (i.e., the initially displayed screen of the application in question) since this is the first step and the selected action was "click". The reporter would then select the component they acted upon, e.g., the "OK" button located at the center of the screen as shown in FIG. 4.

Figure 5:
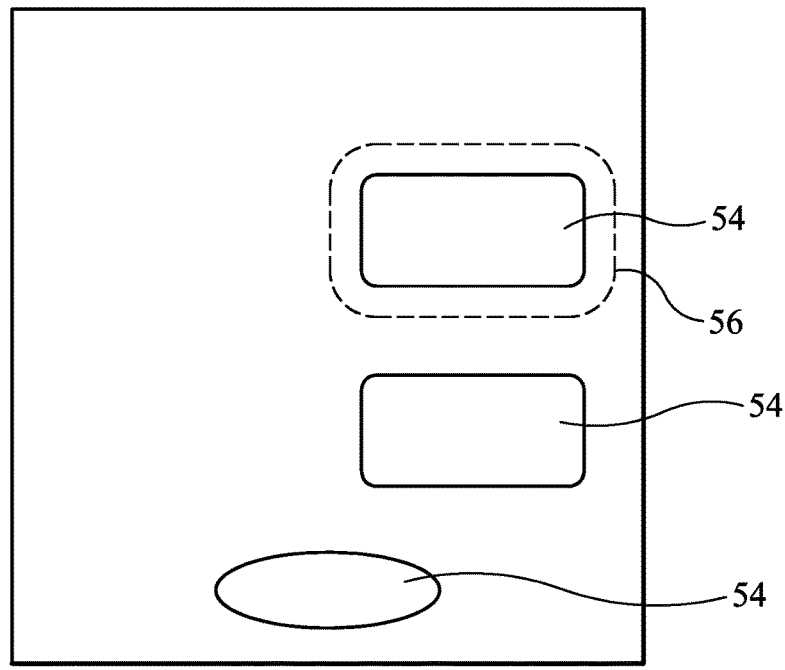
FIG. 5 is a screen shot of the bug reporter's display depicting an augmented mobile device screen highlighting the screen location of the GUI component associated with the possible action at the execution step.
Figure 6:
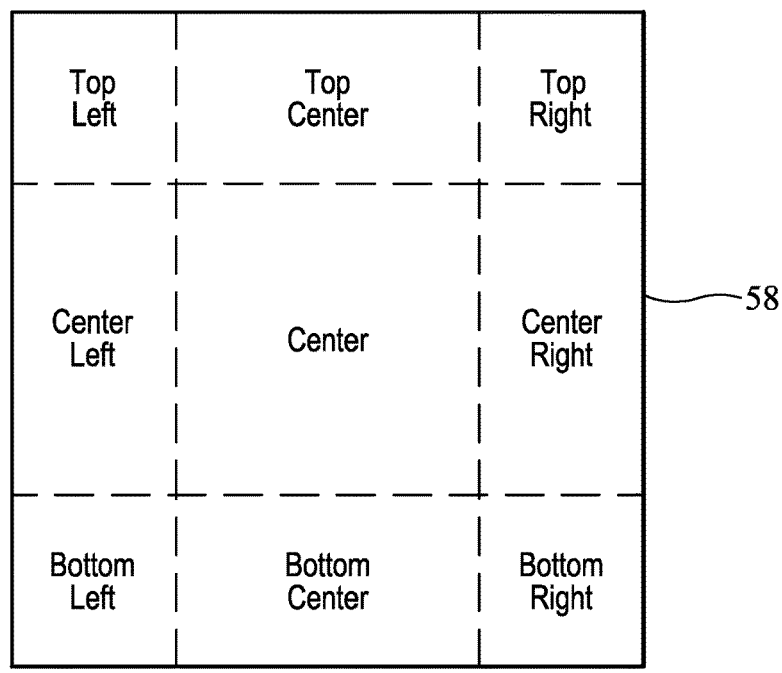
FIG. 6 is an enumeration of the relative locations in which GUI components can appear on a given application screen.

A potential complication with component selection from a drop down list results when there are duplicate components on the same screen in the app. Prompt generator 44 solves this problem in two ways. First, prompt generator 44 differentiates each duplicate component from the last through specifying text "Option #". Such a designation is necessary because GUI-components displayed on a particular screen could be identical according to their attributes excluding location (e.g. in terms of component type, and the text associated with the component). Second, prompt generator 44 attempts to confirm the component entered by the reporter at each execution step by fetching augmented screen shots from database 30 representing the entire device screen, e.g., a mobile device's screen. Each of the screen shots highlights the representative GUI component 54 (that would appear on the device screen) with an overlay indicator 56 (e.g., a dashed line box in the illustrated example) as shown in FIG. 5. To complete the step entry, the reporter simply selects the screen shot corresponding to both the app state and the component acted upon. For example, FIG. 5 shows an augmented screen shot with overlay indicator 56 highlighting a button 54 located in the "CENTER RIGHT" of the display. The reporter can refer to a screen enumeration 58 (shown in FIG. 6) for a graphical list of location identifications to use for the possible relative locations of components on the screen.

After the reporter makes selections from the drop down lists, they have an opportunity to enter additional information for each execution step (e.g., a button had an unexpected behavior) in a natural language text entry field. For the running example, the reporter might indicate that after pressing the "OK" button, the pop-up window took longer than expected to disappear.

Prompt generator 44 uses the data collected by analysis processor 20 and stored in database 30. That is, when prompt generator 44 suggests completion definitions appearing in the drop down lists, prompt generator 44 queries database 30 for the corresponding state of the app event flow and suggests information based on the past steps that the reporter has entered. For example, if a "cold start" for the app is always assumed by prompt generator 44, the reproduction steps process always begins from the app's Main Activity. However, since bug reporting could conceivably begin from any of a plurality of application states, the present invention could be initiated at any state wherein analysis processor 20 would extract the corresponding data. The reporter's progress is tracked through the app using predictive measures based on past steps.

Figure 7:
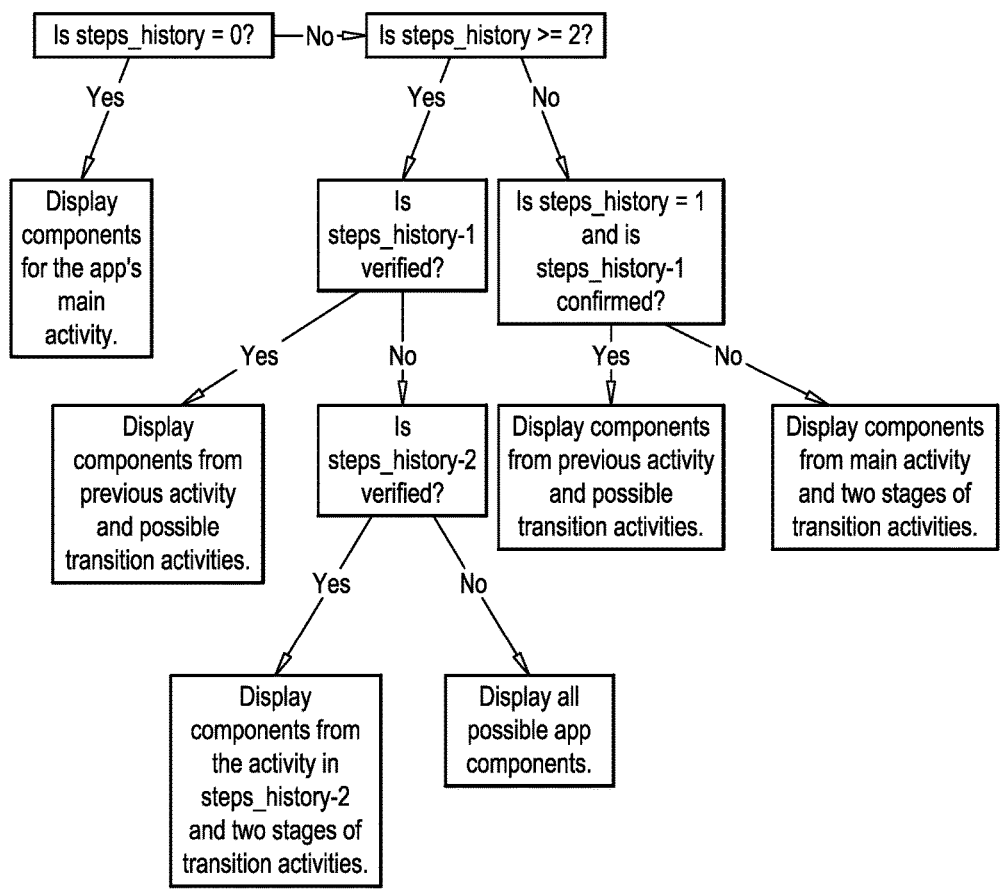
FIG. 7 is a diagram of a decision tree used by the system's prompt generator when predicting prompts to be displayed on a bug reporter's display.

Prompt generator 44 operates on execution steps using several different pieces of information as input. For example, the reporter's reproduction steps are modeled as an ordered stream of steps S where each individual step $s_i$ may be either empty or full. Each execution step can be modeled as a five-tuple consisting of {step number, action, comp name, activity, history}. The "action" is the gesture provided by the reporter in the first drop-down menu. The "comp name" is the individual component name as reported by the UIautomator interface during dynamic extraction. The "activity" is the screen the component is found on. The "history" is the history of steps preceding the current step. Prompt generator 44 predicts the suggestion information using the decision tree logic shown in FIG. 7. The logic set forth in the decision tree is responsible for predicting the components that are able to be interacted with along a certain user execution path.

Prompt generator 44 presents components to the reporter at the granularity of activities or application screens. To summarize the suggestion process, prompt generator 44 looks back through the history of the past few steps and looks for possible transitions from the previous steps to future steps depending on interaction of the components. If prompt generator 44 is unable to capture the last few steps from the reporter due to the incomplete application execution model mentioned earlier, then prompt generator 44 presents the possibilities from all known screens of the app. In the running example, assume the reporter moves on to report the second reproduction step. In this case, prompt generator 44 would query the history to find the previous activity the "OK" button was located within, and then present component suggestions from that activity in case the user stayed in the same activity. Component suggestions from possible transition activities could be made in the case where the user transitioned to a different activity.

Because DFS-based exploration used in dynamic execution 26 is not exhaustive, there may be gaps in database 30 related to possible app screens (e.g., a dynamically generated component that triggers an activity transition was not acted upon). Accordingly, a reporter may not find the appropriate suggestion in a drop down list. To account for this, prompt generator 44 can also be configured to allow the bug reporter to select a special option when they cannot find the component they interacted with in the auto-complete drop down list. In the running example, assume the reporter wants to indicate that they clicked the button labeled "Open Document," but the option is not available in the auto-complete component drop-down list. In this case, the reporter would select a "Not in this list . . . " option and manually fill in (i) the type of the component, (ii) any text associated with the component (in this case "Open Document"), and (iii) the relative location of the component on the screen display.

Prompt generator 44 saves the reporter's execution step definitions in database 30 (or some other database). The stored execution step definitions leading to a bug are used by a report generator 46 to generate a structured report. Since such reports would generally be of greatest value to an app's developer(s), a report generated by system 10 is assumed to be initiated by a developer's device 60 via, for example, the internet 100.

Figure 8:
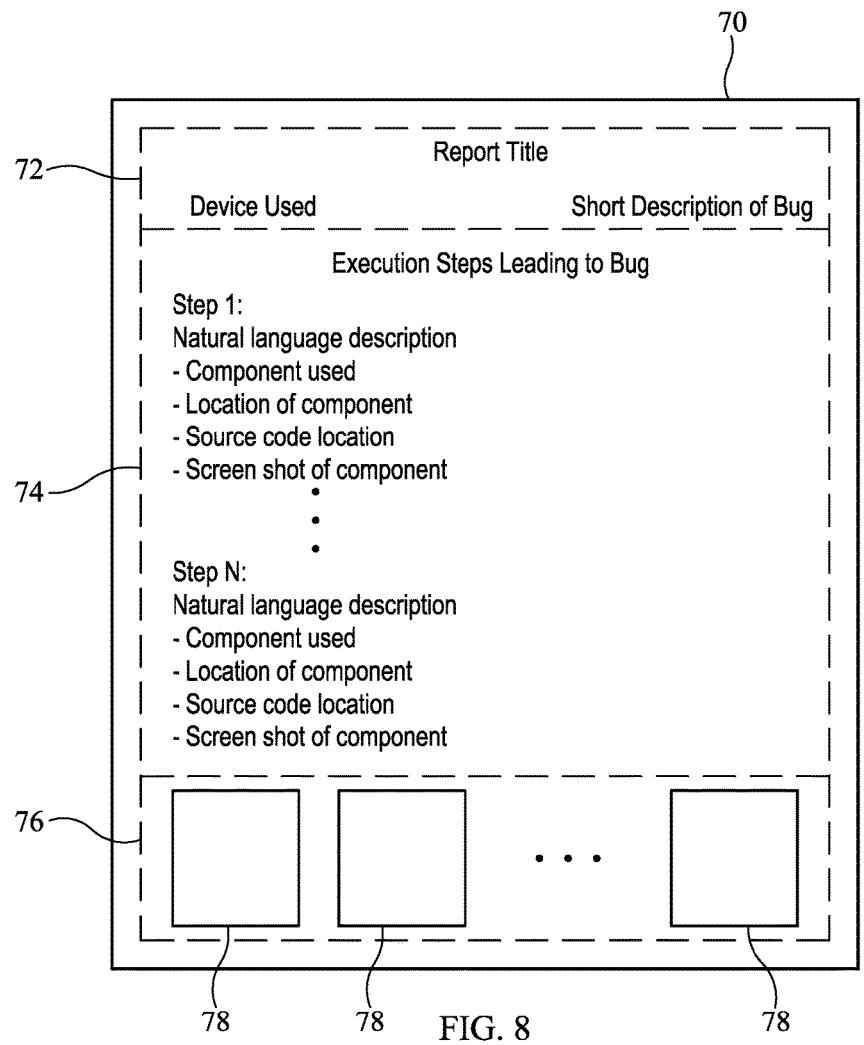
FIG. 8 is a generalized display layout of a bug report generated in accordance with an embodiment of the present invention.

Referring additionally to FIG. 8, report generator 46 causes data to be presented at/on device 60 in the form of an electronic image 70 that can be divided into three major sections. A first section 72 presents preliminary information to include, for example, a report title, device used when the bug occurred, and a short textual description of the bug. A second section 74 presents the stepwise list of execution steps traversed along the execution path leading to the bug. For each execution step, section 74 can include, for example, the selected/defined action for each execution step, the type of component used to carry out the action, the relative location of the component used to carry out the action, the activity Java class where the component is instantiated in the source code, and the component specific screen shot. A third section 76 presents the stepwise list of full screen shots 78 corresponding to each execution step traversed along the execution path that led to the bug. In this way, sections 72, 74 and 76 provide a developer with a complete picture of how the bug was produced.

Each execution step presented in section 74 can lead with a natural language description of the reporter's execution step definitions. Each such natural language description is generated using a natural language template having "blanks" that are filled in with the reporter's execution step definitions such as the {action, component} tuple defined at each execution step as described earlier herein. By way of an illustrative example, a natural language description could be constructed using the following natural language template: "<action> on <component>, which is located on the <relative location> of the screen."
For the execution steps that have text associated with them, the <action> placeholder can be modified into, for example, "Typed <text input> on the <component> . . . " in order to capture any specific text inputs from the reporter.

The combination of the natural language description of each execution step and other data presented in sections 74 and 76 provides the developer with a picture of what the reporter sees. At the same time, each execution step in section 74 provides links to the components/attributes in the source code that impact what the reporter sees and experiences. The computer aided bug reporting system of the present invention provides a bug reporter with a simple prompt interface to define the execution steps leading to a bug, and provides a developer with a stepwise report of the reporter's experience and the source code elements associated with each execution step.

INCORPORATION BY REFERENCE

All publications, patents, and patent applications cited herein are hereby expressly incorporated by reference in their entirety and for all purposes to the same extent as if each was so individually denoted.

Equivalents

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

We claim:

1. A computer aided method for generating a hug report for a GUI application, comprising the steps of:
    extracting static data indicative of GUI components and attributes of said GUI components from source code for a GUI-based application having execution paths that generate a plurality of screen displays according to user interactions during run-time execution of said source code, each of said screen displays using said GUI components defined by said source code, said attributes including one of more of: possible actions on said GUI components, types of said GUI components, activities said GUI components are contained within, and class files where said GUI components are instantiated;
    storing said static data in a database;
    executing said source code in a run-time environment through said execution paths according to automatically-generated user inputs, wherein each of said execution paths is defined by execution steps and wherein each of said execution steps generates a run-time screen display using, at least one of said GUI components;
    storing, in said database, dynamic data indicative of each said run-time screen display;
    generating, using said static data and said dynamic data, a sequence of prompts on a first electronic display device, said sequence of prompts being ordered in accordance with one of said execution paths subject to a software bug Wherein each of said prompts is associated with one of said execution steps leading to said software bug, each of said prompts presenting said GUI components associated with said one of said execution steps, said attributes of said GUI components associated with said one of said execution steps and user action options associated with said one of said execution steps, wherein said user action options are suggestions generated using said static data and said dynamic data to provide a user with a selection of said possible actions the user can perform at said one of said execution steps and a selection of attributes of said GUI components associated with said possible actions the user can perform at said one of said execution steps: and
    generating a report for presentation on a second electronic display device, said report listing ones of said execution steps leading to said software bug and presenting said run-time screen display associated with each of said ones of said execution steps leading to said software bug based on said user action options selected by a user.

2. A computer aided method for generating a bug report as in claim 1, further comprising the step of displaying a screen shot on said first electronic display device for selected ones of said execution steps having duplicate ones of said GUI components appearing thereon.

3. A computer aided method for generating a bug report as in claim 1, wherein said step of generating said report further comprises the steps of:

generating a natural language description related to each of said ones of said execution steps leading to said software bug using a natural language template; and displaying said natural language description in said report.

* * * * *